J. J. MILLER.
LAWN SPRINKLER.
APPLICATION FILED OCT. 12, 1914.
1,204,297.
Patented Nov. 7, 1916.
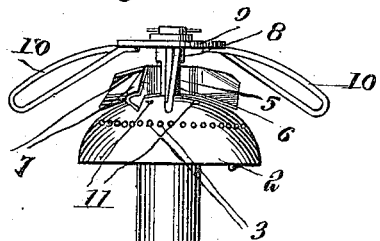
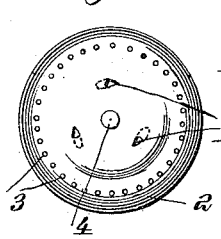
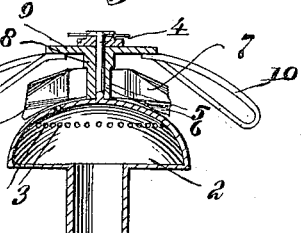
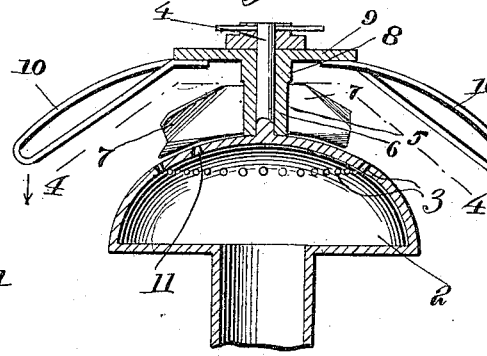
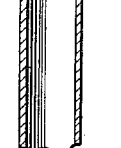
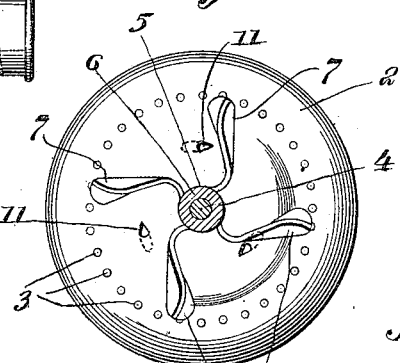
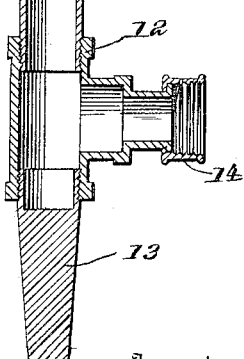
Inventor
Joseph J. Miller
By Victor J. Evans
Attorney
Witnesses
M. T. Bosley
John J. McCarthy

UNITED STATES PATENT OFFICE.

JOSEPH JOHANSON MILLER, OF DULUTH, MINNESOTA.

LAWN-SPRINKLER.

1,204,297.     Specification of Letters Patent.     Patented Nov. 7, 1916.

Application filed October 12, 1914. Serial No. 866,405.

*To all whom it may concern:*

Be it known that I, JOSEPH J. MILLER, a citizen of the United States, residing at Duluth, in the county of St. Louis and State of Minnesota, have invented new and useful Improvements in Lawn-Sprinklers, of which the following is a specification.

This invention relates to improvements in lawn sprinklers, and has particular application to portable sprinklers.

In carrying out my invention, it is my purpose to improve and simplify the general construction of portable lawn sprinklers and to provide a sprinkler whereby the jets of water will be effectively broken up, thereby increasing the efficiency of the sprinkler.

It is also my purpose to provide a lawn sprinkler which may be handled conveniently and transported from place to place with ease and facility and which may be inserted into the ground when in use.

With the above and other objects in view, the invention consists in the construction, combination and arrangement of parts hereinafter set forth in and falling within the scope of the claim.

In the accompanying drawings: Figure 1 is a view in side elevation of a lawn sprinkler constructed in accordance with the present invention, the same being shown in use; Fig. 2 is a vertical central sectional view through the sprinkler; Fig. 3 is an enlarged vertical sectional view through the sprinkler head; Fig. 4 is a cross sectional view on the line 4—4 of Fig. 3; and Fig. 5 is a top plan view of the sprinkler head, the movable parts being detached.

Referring now to the drawings in detail, 1 designates a tube constructed of suitable material and of any desired length. Secured to one end of the tube 1 is a sprinkler head 2 shaped after the fashion of a hemisphere and in open communication with the tube 1. Formed in the circular wall of the hemispherical head 2 is an annular row of orifices 3 appropriately spaced apart and disposed concentrically of the axis of the head. Secured to the circular wall of the head 2 at a point centrally thereof and projecting upwardly therefrom is a pin 4 and rotatably mounted upon the pin 4 is a water wheel 5 comprising a hub 6 encircling the pin and blades 7 radiating from the hub. Encircling the pin 4 above the wheel 5 and connected to or formed integral with the adjacent extremity of the hub 6 is a collar 8 carrying a disk 9 disposed concentrically of the pin 4. Connected with the under surface of the disk 9 and radiating therefrom are outwardly projecting arms 10. These arms are spaced apart equal distances about the disk and curved downwardly in conformity with the arc of a circular wall of the hemispherical head 2, the outer end of the arm 10 terminating beyond the orifices 3. Formed in the circular wall of the head 2 within the row of orifices 3 is a series of apertures 11 spaced apart equal distances away from the pin and opening diagonally through the circular wall of the head.

In the present instance the lower end of the tube 1 is connected with one side of the head of a T-coupling 12 and suitably connected with the other side of the T-coupling and alining axially with the tube 1 is a spear 13 adapted to be forced into the earth so as to support the tube and head in a vertical position. The laterally projecting limb of the T-coupling 12 is equipped with a suitable or well known form of connector 14 whereby the tube may be connected up with a hose or other source of water supply.

In practice, the spear 13 is embedded in the earth thereby holding the tube 1 and the head 2 in a vertical position. The hose is now connected up with the T-coupling and the controlling valve of the water supply opened. The water flows upwardly within the tube 1 and is discharged through the orifices 3 in the form of individual jets or streams. Simultaneously with the flow of water through the orifices 3 a portion of the water flows through the apertures 11 and impinges against the blades 7 of the wheel 5, thereby revolving the latter and the disk 9. In the rotation of the disk, the arms 10 travel across the path of the jets or streams of water issuing from the orifices 3, thereby breaking up the jets so that a fine spray is produced.

I claim:—

In a device of the class described, in combination, a tube, a hemi-spherical head formed thereupon and having a circumferentially disposed series of openings and between said openings and its center being formed with a series of obliquely disposed ports, an integral pin formed upon the periphery of said head, a collar surrounding said pin and resting upon said head and having an integral disk at right angles to said collar and revolving therewith, a turbine consisting of a plurality of blades each of which has a shank portion secured to said collar and another portion extending at an angle to said shank portion and curving around the surface of said head, the angular portion of each blade being provided with flanges forming a channel for guiding water therethrough over said head, said oblique opening adapted to discharge water directly against the angular part of each blade and between its flanges, a plurality of radially disposed arms carried by said disk and adapted to break the water issuing through said firstnamed openings, and means for holding said disk against displacement from said pin, the blades of said turbine having their outer edges spaced inwardly from said firstnamed series of openings.

In testimony whereof I affix my signature in presence of two witnesses.

JOSEPH JOHANSON MILLER.

Witnesses:
J. B. RICHARDS,
AAGOT JOHNSON.